United States Patent [19]

Gaylor et al.

[11] 4,381,977
[45] May 3, 1983

[54] ELECTROCHEMICAL MAINTENANCE OF OPTIMUM CATALYTIC ACTIVITY IN COPPER-CATALYZED NITRILE HYDROLYSIS PROCESSES

[75] Inventors: V. Frances Gaylor, Parma; Janice L. Greene, Chagrin Falls; Arthur F. Miller, Lyndhurst; Marty A. Pichler, Parma, all of Ohio

[73] Assignee: The Standard Oil Company, Cleveland, Ohio

[21] Appl. No.: 304,211

[22] Filed: Sep. 21, 1981

Related U.S. Application Data

[62] Division of Ser. No. 136,191, Apr. 1, 1980, Pat. No. 4,313,803.

[51] Int. Cl.³ .................. C25B 1/00; C25B 3/00; C07C 103/72
[52] U.S. Cl. .................. 204/74; 204/72
[58] Field of Search .................. 204/72, 74, 59 R

[56] References Cited

U.S. PATENT DOCUMENTS

| Re. 28,525 | 8/1975 | Greene et al. | 564/127 |
|---|---|---|---|
| 1,194,354 | 8/1916 | Bucher | 204/72 X |
| 3,631,104 | 12/1971 | Habermann et al. | 564/127 |
| 3,645,913 | 2/1972 | Habermann | 252/416 |
| 3,755,100 | 8/1973 | Epple | 204/74 |
| 3,764,494 | 10/1973 | Allain et al. | 204/74 |
| 3,766,088 | 10/1973 | Yoshimura et al. | 252/412 |
| 3,767,706 | 10/1973 | Habermann et al. | 564/127 |
| 3,869,511 | 3/1975 | Johnson et al. | 564/127 |
| 3,920,740 | 11/1975 | Svarz et al. | 252/477 Q X |
| 3,928,443 | 12/1975 | Allain et al. | 252/477 Q X |
| 3,944,609 | 3/1976 | Fetchin et al. | 564/127 |
| 3,994,973 | 11/1977 | Habermann et al. | 564/127 |
| 3,997,606 | 12/1976 | Kane et al. | 564/127 |
| 4,000,195 | 12/1976 | Svarz | 252/477 Q X |
| 4,014,820 | 3/1977 | Svarz et al. | 252/463 |
| 4,056,565 | 11/1977 | Matsuda | 564/127 |

FOREIGN PATENT DOCUMENTS

1539705 1/1979 United Kingdom .

OTHER PUBLICATIONS

Watanabe, Bull. Chem. Soc. Japan, vol. 37, pp. 1325–1329. 9/1964.
Hatta et al., Chemical Abstracts, vol. 82, No. 16, Abstract 82(16)104821c, 1975.

*Primary Examiner*—F. Edmundson
*Attorney, Agent, or Firm*—Salvatore P. Pace; Herbert D. Knudsen; Larry W. Evans

[57] ABSTRACT

An electrochemical method is provided for maintaining the optimum activity of copper-containing catalysts for the production of amides from nitriles and water. Also provided is a process for producing amides from nitriles and water by hydrolysis.

5 Claims, 1 Drawing Figure

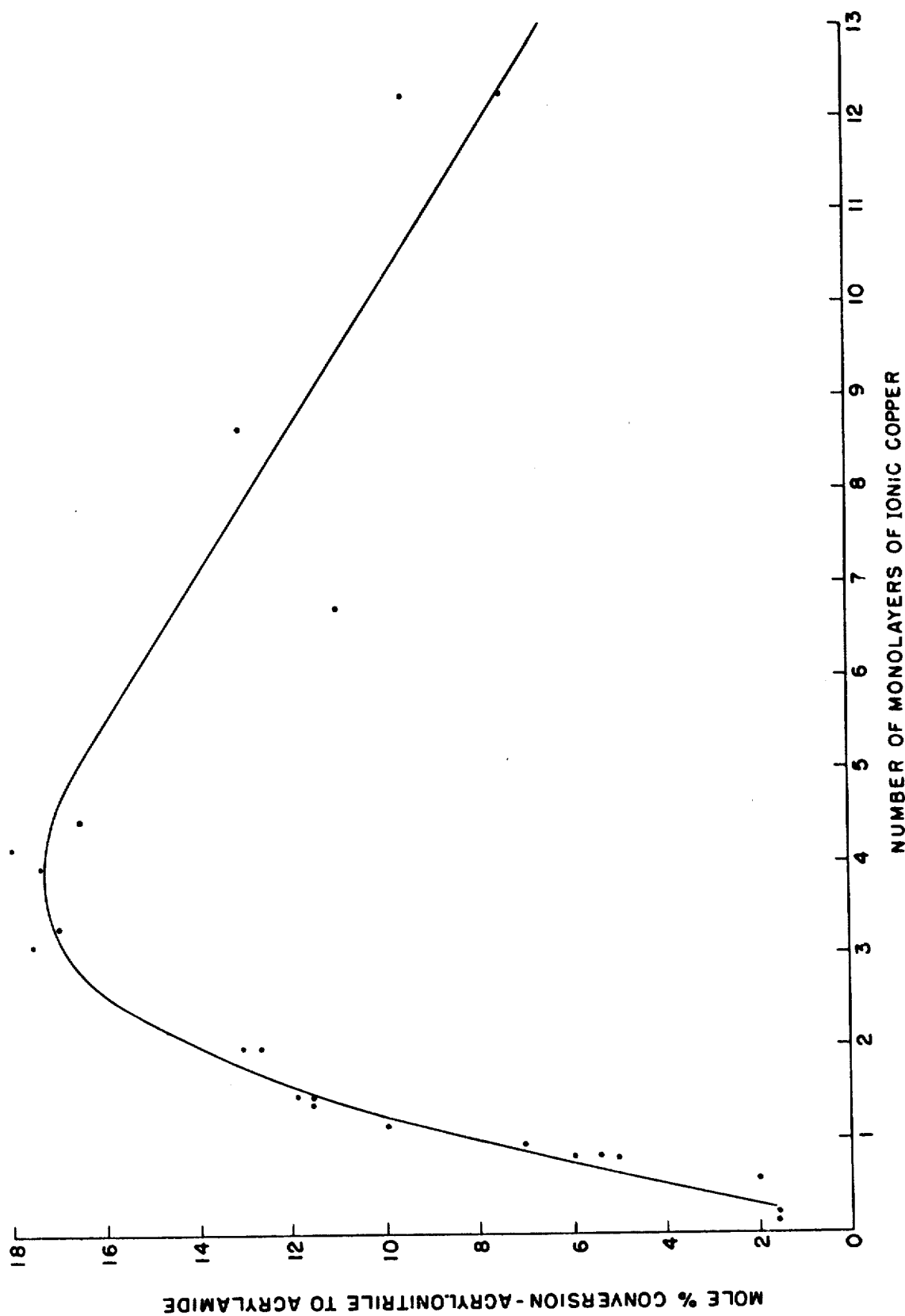

4,381,977

ELECTROCHEMICAL MAINTENANCE OF OPTIMUM CATALYTIC ACTIVITY IN COPPER-CATALYZED NITRILE HYDROLYSIS PROCESSES

This is a division of application Ser. No. 136,191 filed Apr. 1, 1980, now U.S. Pat. No. 4,313,803.

BACKGROUND OF THE INVENTION

This invention relates to hydrolyzing nitriles with water to produce their corresponding amides, and catalysts useful therefore. More specifically, this invention relates to the hydrolyzing of nitriles such as acrylonitrile, preferably in aqueous solution, in the presence of a catalyst comprising metallic copper and having an optimum surface film coverage of ionic copper, to produce corresponding amides such as acrylamide.

The formation of amides by hydrolyzing nitriles with water in the presence of copper ions was taught by Greene et al. in U.S. Pat. No. Re 28,525. The effective copper species were disclosed as being catalytic combinations of at least two selected from $Cu^\circ$ and/or $Cu(I)$ and/or $Cu(II)$.

U.S. Pat. No. 3,631,104, to Habermann et al. discloses catalysts of copper, copper oxides, copper-chromium oxide, copper-molybdenum oxide or mixtures thereof for the hydration of nitriles and water to their corresponding amides. Habermann et al. teach that it is desirable to reduce the cupric oxide to cuprous oxide and that in preferred catalysts, the copper content is essentially cuprous oxide containing a minor amount of copper metal. The conversion of acrylonitrile to acrylamide in the examples generally decreased with time when cupreous catalysts alone were used. U.S. Pat. No. 3,767,706 to Habermann et al. discloses the catalyst consisting essentially of copper metal which is effective in the hydration of nitriles and water to their corresponding amides. U.S. Pat. No. 3,994,973 to Habermann et al. discloses catalysts consisting of copper prepared by reducing copper oxides, of reduced oxides, or unreduced copper oxides for use in the same process.

U.S. Pat. No. 3,944,609, Fetchin et al. discloses catalysts consisting of reduced copper-iron compounds containing from 0.2% up to about 5% iron. The conversion of acrylonitrile to acrylamide is shown to decrease with respect to the amount of time the catalyst is stored. U.S. Pat. Nos. 3,920,740; 4,000,195 and 4,014,820 to Svarz et al. disclose copper-aluminum alloy catalysts pretreated with alkali metal hydroxides, useful for hydrolyzing acrylontrile to acrylamide.

U.S. Pat. No. 3,755,100 to Epple discloses the use of copper electrodes to electrolyze aqueous solutions of acrylonitrile with A.C. current to produce acrylamide. Epple teaches that the pH of the aqueous solution must be alkaline, adjusted to about 9.5–14. U.S. Pat. No. 3,764,494 to Allain et al. discloses the use of copper electrodes to electrolyze aqueous solutions of acrylonitrile with D.C. current to produce acrylamide. Allain et al. teach that the pH of the aqueous solution is critical and that it should be in the range of 7–10.5. A D.C. voltage of 10 V at 5 amp. was applied to the cell, reversing polarity every 5 seconds. Yield of acrylonitrile from acrylamide was about 37%.

U.S. Pat. No. 3,645,913 to Habermann discloses the regeneration of copper-containing catalysts by oxidizing the spent catalyst with an oxygen-containing gas at an elevated temperature and thereafter reducing the catalyst. U.S. Pat. No. 3,766,088 to Yashimura et al. discloses the regeneration of metallic copper catalysts by treating the spent catalyst with an aqueous solution of sodium compounds, potassium compounds, calcium compounds or ammonium compounds and thereafter washing the catalyst fully with water. U.S. Pat. No. 3,869,511 to Johnson et al. discloses maintaining or improving catalytic activity of copper catalysts defective in hydrolyzing nitriles to amides by introducing anions such as $Cl^-$, $Br^-$, $NO_2^-$, $NO_3^-$ into the reactant feedstream. Cations such as alkali metal and alkaline earth metal ions, including sodium, are taught to be inert with respect to any improvement of catalytic activity, and anions such as acetate are taught to be either inert or to have detrimental affect on catalytic activity.

The use of various copper-containing catalysts, either consisting essentially of one of or comprising a combination of $Cu^\circ$, $Cu(I)$ and $Cu(II)$, for hydrolyzing nitriles to amides therefore is known to the art. However, the optimum relations between the amounts of each copper species for the hydrolysis process has heretofore been unknown. Because the optimum formulation of the catalyst was unknown and because the copper-containing catalyst generally suffers quick deactivation, it has been necessary to wait for conversion of the nitrile to amide to fall off to begin regeneration procedures.

We have discovered that maximum catalytic efficiency in the copper-catalyzed nitrile hydrolysis process unexpectedly occurs when the copper catalyst utilized comprises elemental or metallic copper having upon its surface a film of an average of about 0.75 to about 12.5 monolayers of ionic copper.

In practicing the nitrile hydrolysis process, it is not possible to maintain peak catalyst activity for long periods of time. Unavoidable admission of air or other oxidants, including non-oxygen containing oxidants, to the catalyst due to impurities in the liquid feed, or from mechanical leaks, thickens the surface film and so causes deterioration in catalyst performance. Conversely, deterioration in catalyst performance can also result from loss of ionic copper from the surface, such as by solubilization in the reaction mixture. Simultaneous operation of both processes would tend to prolong catalyst life if rates of the two processes were similar. The two rates are evidently not similar, since significant decay of catalyst activity soon occurs.

SUMMARY OF THE INVENTION

It is therefore an object of the present invention to provide a method for maintaining the optimum activity of a catalyst effective in the production of amides from nitriles and water.

It is a further object of the present invention to provide a method for maintaining the optimum activity of a copper-containing catalyst effective in the production of amides from nitriles and water by maintaining an optimum relation between metallic copper and ionic copper.

It is a further object of the present invention to provide an electrochemical method for maintaining the optimum activity of a copper-containing catalyst effective in the production of amides from nitriles and water.

It is a further object of the present invention to provide a process for the preparation of amides from nitriles and water in the presence of a copper-containing catalyst wherein the optimum relation between metallic copper and ionic copper is maintained electrochemically.

In general, the method of the present invention for maintaining the activity of a catalyst useful in producing amides from nitriles comprises utilizing a copper-containing catalyst as at least one electrode of an electrochemical reactor which contains a solution which includes the nitrile of interest and water; and applying a direct current potential to the reactor as required to maintain the activity of the catalyst.

The process for the preparation of amides from nitriles and water according to the present invention comprises contacting a solution of a nitrile, such as acrylonitrile and water in an electrochemical reactor having at least one partially metallic copper electrode and introducing at least intermittently, a direct current potential to said reactor.

BRIEF DESCRIPTION OF THE DRAWING

The FIGURE is a graph on which is plotted the average number of monolayers of ionic copper partially covering the surface of metallic copper catalysts versus the molar percent conversion of acrylonitrile to acrylamide resulting when using the copper-containing catalysts in the hydrolysis of acrylonitrile.

DETAILED DESCRIPTION OF THE INVENTION

Copper-containing catalysts have been used for hydrolyzing nitriles with water to produce amides, such as in the preparation of acrylamide from acrylonitrile and water. These catalysts have been described as being either essentially one of or a combination of the various species of copper, that is, copper in the elemental or in the various oxidized states.

We have discovered the optimum relation between the amounts of the various species of copper which are required to be present in order to maximize catalytic activity for the hydrolyzing of nitriles to amides. We have found that the maximum catalytic efficiency in the copper-catalyzed hydrolysis process occurs when the copper catalyst utilized comprises elemental, or metallic, copper having upon its surface a film of ionic copper, that is, copper in an oxidized state. This optimized catalyst comprises Cu° having at least partial surface coverage by an average of about 0.75 to about 12.5 monolayers of one or more ionic copper compounds, that is Cu(I) or Cu(II). When the ionic copper species is substantially $Cu_2O$ film thickness of this surface coverage is optimally in the range of about 3.5 Å to about 50 Å. It is preferred that the surface coverage not be complete, and that there be at least some Cu° on the surface to contact the reaction solution.

A test was devised to measure very small differences in catalytic activity between copper-containing catalysts of different species, that is, between catalysts containing copper in one or more ionization or oxidation states, including metallic copper, Cu° and ionic copper Cu(I) and Cu(II). Because of the mild conditions of the test, the conversions exhibited are not equal to the high conversions obtained under more rigorous conditions, but are proportionally accurate with respect to each other. We found a surprising and dramatic increase in catalytic activity when an elemental copper catalyst was utilized which had a surface which was partially covered with a film of ionic copper, the film being from about 0.75 to about 12.5 monolayers thick.

This dramatic increase of catalytic activity, measured by the conversion of acrylonitrile to acrylamide as demonstrated graphically in the FIGURE when plotted against the number of monolayers of ionic copper partially covering the surface of the copper catalyst utilized. As can be seen from the FIGURE, the activity of the catalyst increases dramatically as ionic copper is added to the surface to form a partial film averaging from about 0.75 monolayer of ionic copper up to about 2.5 monolayers of ionic copper. The catalytic activity peaks and remains extremely high when the film thickness of ionic copper is within the range from about 2.5 to about 9 monolayers. The catalytic activity of the copper catalyst then begins to decline as more monolayers of ionic copper are added to the film, until after an average film thickness of about 12.5 monolayers of ionic copper is achieved, the catalytic activity of the catalyst decreases to an extent comparable to the activity of the catalyst before an average of an about 0.75 monolayer thick film has been deposited.

The ionic copper which comprises the surface film upon the elemental copper catalyst is preferably $Cu_2O$ and/or $CuO$, preferably $Cu_2O$. This invention is not, however, limited to copper oxide films but includes surface films composed of any other chemically combined form of Cu(I) or Cu(II), such as copper hydroxide, cupric acetate, cuprous acetate, cuprous chloride, cupric chloride and the like, the identity of the ionic compounds depending upon conditions such as the hydrolysis solution, or reaction mix utilized. The ionic copper compound or compounds should have low solubility in the reaction mixture employed in order to prevent rapid depletion of the ionic copper film, but should have sufficient affinity, as determined by partial solubility to render the ionic compounds, together with any metallic copper present at the surface, capable of coordinating the reactants.

EXAMPLES 1-8

In Examples 1-8, an ionic copper film was produced chemically upon a metallic copper-containing catalyst. Raney copper, which had been stored in a closed bottle in a $N_2$ glove bag, was transferred to a vacuum oven and dried at ambient temperature for about 16 hours. Several 1.05 g portions of the dried copper were then weighed in air, and transferred in a nitrogen-purged glove bag to a hydrogen reduction apparatus. The reduction apparatus consisted of a source of hydrogen connected sequentially, via stainless steel tubing to a deoxygenating furnace and to catalyst-containing hypovials seated within an electrically heated block furnace. An exit for the hydrogen was provided by stainless steel tubing which was routed to a flowmeter. The weighed samples were reduced for four hours at the temperatures noted in Table I, with a gas mixture consisting of 20% $H_2$/80%$N_2$, using flow rates as listed in Table I.

Following reduction, about 50 mg of the reduced copper was transferred to a small glass vial, closed and sealed under a $N_2$ atmosphere. The ionic copper present as a surface film on these samples was determined to be $Cu_2O$. Under a $N_2$ atmosphere, the samples were washed with 3 portions of a reducing acid solution, consisting of 0.2 molar HCl, 0.02 molar hydrazine sulfate and excess chloride 0.12 molar from NaCl. The three washes were combined and analyzed for dissolved cuprous oxide by polarography. The residual elemental copper was dissolved in concentrated $HNO_3$ and copper content was determined polarographically. The total sample weight was derived from the combined total of the two polarographic analyses, and the amount of unreduced Cu₂O was calculated.

A 15 ml portion of aqueous acrylontrile solution, 6.4% by weight of water, was added to each 1.0 gram sample of the copper catalyst listed in Table I, the glass container being closed and sealed under a $N_2$ atmosphere. The glass container was placed in an 80° C. oven and hydrolysis was allowed to proceed for one hour. The liquid phase was then analyzed for acrylamide by gas chromatography. The results of the tests performed on Examples 1-8 are reported in Table I, which lists the average number of monolayers of ionic copper on the copper catalysts utilized, the resulting conversion of acrylonitrile to acrylamide and the reduction conditions imposed upon each catalyst.

EXAMPLES 9-14

In Examples 9-14, Raney copper which has been stored as an aqueous slurry in a closed bottle in a $N_2$ glove bag was transferred to a vacuum oven and dried at ambient temperature for approximately 7 hours. A 0.50 g portion of the dried copper was then weighed in air and pressed into a pellet of 0.035 inch thickness (0.89 mm) and 13 mm diameter at two tons (1800 kg.) pressure for 5 minutes. The pressed pellet was then mounted in the reaction compartment of a 20 ml electrochemical cell/reactor. 7.5 ml portions of 1.0 molar sodium acetate solution, which was buffered to pH 5 with acetic acid, were then added to both the reaction and auxiliary (cathode and anode) compartments, and the reaction solution was purged with argon for deoxygenation. The reactor cell was closed and a constant D.C. potential, listed in Table II, was applied for approximately 16 hours. During electrolysis the Raney copper pellet served as the working electrode, the auxiliary electrode was a platinum electrode and the reference electrode was a silver/silver chloride electrode. The reaction and auxiliary (cathode and anode) compartments were separated by a Nafion cation exchange membrane. (Nafion is a trademark of E. I. DuPont deNemour and Company for a perfluorosulfonic acid membrane.) A potentiostat equipped with a digital coulometer was used for potential control.

Following the 16 hour electrolysis, both compartments of the reactor were drained and refilled with deoxygenated aqueous acrylonitrile solution, containing about 7.2% acrylonitrile based upon the weight of the water. The reactor was placed in an 80° C. oven where hydrolysis was conducted for one hour. The liquid product was then analyzed for acrylamide by gas chromatography.

The amount of copper ion coverage on the electrochemically pretreated metallic copper pellets was determined from coulombs consumed during the 16 hour electolytic pretreatment process, as set forth below. The results of the hydrolysis carried out in Examples 9-14 are contained in Table II, including the average number of monolayers formed on the catalytic copper electrode during the pretreatment electrolysis, the potential applied during pretreatment, the rest potential of the treated electrode, and the conversion of acrylonitrile to acrylamide using the subject catalyst.

The average number of monolayers disposed upon the surface of the metallic copper electrode was determined in the following manner. The surface area of the catalysts were determined by the dynamic nitrogen adsorption method. It was determined that the ionic copper compounds formed on the metallic copper electrodes under the reaction conditions of the examples was almost exclusively cuprous oxide ($Cu_2O$). This determination was made and corroborated by x-ray diffraction, voltammetry and electron spectroscopic chemical analysis. A potential was applied to the catalytic electrode in an electrochemical cell in order to reduce copper Cu(I) to Cu° according to the half-cell formula:

$$Cu_2O + 2H^+ + 2e^- = 2 Cu° + 2H_2O.$$

The amount of current required to reduce the cuprous oxide to copper metal was measured and the number of coulombs required to reduce the oxide was determined. The average thickness of the cuprous oxide layer was determined according to the following formula:

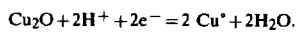

$$(Q \times Mw)/(n \times 96,500 \times d \times A)$$

where Q is the number of coulombs required, Mw is the molecular weight of the ionic compound, n is the number of electrons required to convert the ionic copper species to elemental copper, d is the density of the ionic compound and A is the surface area of the catalyst. The average thickness of the ionic copper coverage was divided by the thickness of one monolayer of the ionic compound in order to determine the average number of monolayers.

Maintaining Optimum Catalytic Activity

From the results of Tables I and II it can be seen that the activity of copper-containing catalysts for the hydrolysis of nitriles to amides is optimized when the catalyst comprises at least some copper metal having disposed upon its surface at least a partial coverage or film of ionic copper, this film having an average thickness of about 0.75 to about 12.5 monolayers of ionic copper material. During the hydrolysis reaction, this partial average surface coverage tends to either decrease or increase, depending upon the conditions imposed on the reaction mixture. The ionic copper may solubilize and be lost from the catalytic surface, which would tend to lessen the surface coverage, or additional elemental copper may oxidize due to impurities or oxygen contained in the reaction medium which would tend to increase the coverage of ionic copper. The ionic copper might also complex with either the reactant nitrile with the product amide and be unavailable for further catalytic reaction.

We have found that the optimum catalytic activity of copper-containing catalysts may be maintained for extended periods, by maintaining a partial surface coverage on the metallic copper-containing catalyst of an ionic copper film of about 0.75 to about 12.5 monolayers. Preferably the partial surface coverage averages about 2.5 to about 9 monolayers, and more preferably averages about 3 to about 6 monolayers. We have discovered that maintenance of the optimum catalytic activity may be accomplished by electrochemically maintaining the required relation between the metallic copper and the ionic copper film which together comprise the catalyst.

When a copper-containing catalyst is utilized as an electrode in an electrochemical reactor, a ratio between metallic and ionic copper can be controlled through the application of a D.C. potential to the reactor. The copper-containing electrode, having a particular relation between the metallic and ionic copper present will exhibit a distinctive D.C. potential with respect to a reference electrode, for that particular electrochemical reactor. This characteristic potential is best measured in terms of rest potential, that is the potential (voltage) difference between the working electrode and a reference electrode (both immersed in the same liquid) when current flow through the reactor is negligible (i.e., no electrical power is applied to the reactor). The rest potential is also dependent upon the size and type of electrodes used, the size and type of the electrochemical reactor, the electrolyte utilized, temperature and the like. For a given system, however, the optimum rest potential corresponding to the optimum ionic copper surface coverage can be determined and the same maintained via an electrical control such as a potentiostat.

As can be seen from Table II and examples 9–14 above, a rest potential varies with the extent of surface coverage by ionic copper of the metallic copper electrode. By utilizing electric potential control, such as with a potentiostat, if ionic copper is lost from the electrode during the hydrolysis and the rest potential begins to become more negative, a corrective potential may be applied in order to oxidize metallic copper to produce ionic copper. Should ionic copper be added beyond the desired level during the hydrolysis reaction with a corresponding change (less negative) in rest potential of the system, a corrective potential may be applied in order to reduce ionic copper to the elemental state. The working electrode, therefore, may at times be an anode, and at other times be a cathode during the course of a reaction run.

When electrochemical reactors are utilized which do not contain a reference electrode, the relation between the metallic and ionic copper present in the copper-containing electrode catalyst (working electrode) can be identified by the potential difference between the working electrode and the auxiliary electrode (such as a carbon electrode) provided the potential of the auxiliary electrode remains relatively constant. The potential difference between the working and auxiliary electrodes can be monitored, and corrective potentials can be applied to the reactor in order to maintain the desired catalytic identity and thus activity.

According to the process of the present invention, a hydrolysis reactor contains a copper-containing catalyst which is operated as the working electrode of an electrochemical reactor. The copper catalyst itself functions as either the cathodic or anodic electrode as conditions require, and may take the form of any conventional electrode, such as wire, pressed pellets, screens, foil, copper powder, copper shot, copper deposited on a conductor or a non-conductor, and the like. The copper catalyst may be formed predominantly as metallic copper with about 0.75 to about 12.5 monolayers of ionic copper providing at least partial surface coverage, as is preferred, or may contain an amount of a copper-containing material, having at least some metallic copper in association with at least a partial surface coverage of ionic copper in the amounts stated above.

The reaction compartment may also contain an additional electrode of fixed potential, such as a silver/silver chloride reference electrode, in the hydrolysis reaction medium. The reaction compartment is preferably separated from a smaller auxiliary compartment by a permeable membrane of a type commonly used in large scale electrochemical reactors, such as the perfluorosulfonic acid membrane mentioned in the above examples. The auxiliary electrode may be any conventional electrochemical electrode such as a platinum electrode or a carbon electrode and the like.

The hydrolysis reaction feed, containing the nitrile and water, may contain an electrolyte in sufficient concentration to avoid excessive power losses due to high electrical resistance. The electrolyte may be an electrolytically conductive salt, such as sodium acetate, potassium chloride and the like, or may comprise a solid electrolyte permanently mounted in the electrochemical reactor, such as a natural or synthetic polyelectrolyte.

During the hydrolysis reaction, a small D.C. potential approximately equal to the desired rest potential (or potential difference) for the system may be applied to the electrochemical reactor to maintain optimized catalytic activity by maintaining the optimum relation between the metallic and ionic copper in the catalyst electrode such that at least a partial surface coverage of an average of about 0.75 to about 12.5 monolayers of ionic copper is present on the metallic copper catalyst. The actual potential required depends on the electrolyte used, concentration of the electrolyte, pH of the reaction mixture, reaction temperature, amounts and composition of oxidizing impurities to which the catalyst is inadvertently exposed, and the like, as set forth above.

D.C. potential control may be used continuously during hydrolysis and may be monitored by a recording current metering device. In some cases, however, intermittent application of D.C. potential is sufficient to maintain optimum catalytic activity. In such a case, rest potential (potential difference) of the reactor is monitored to determine whether D.C. power application is needed. Power is applied when the reactor rest potential (potential difference) drifts outside preset rest potential (potential difference) limits. The amperage required depends upon the nature of and thus the resistance of the reactor and reaction system. Electrochemical control of catalytic activity can be used with fixed bed, fluid bed or slurry type reactors.

The nitriles useful in the present invention are those having the structure $R-(CN)_x$ wherein R is a hydrocarbon group having from 1 to 10 carbon atoms and x is a number of from 1 to 4. More preferred are nitriles of the foregoing structure wherein R is a member selected from the group consisting of an aromatic hydrocarbon radical, an alkyl radical, an alkylene radical, an alicyclic radical and an olefinic radical having from 1 to 8 carbon atoms and x is a number from 1 to 2. Specific preferred nitriles useful in the present invention include acetonitrile, propionitrile, butyronitrile, acrylonitrile, methacrylonitrile, crotonitrile, maleic dinitrile, glutaronitrile, succinonitrile, adiponitrile, cyclobutane-1,2-dicyanide, benzonitrile, and the like, and others.

The hydrolysis process may be carried out in any solution capable of containing both the nitrile and water, provided that the solvent used does not participate in a competing reaction at the reaction conditions used. An aqueous nitrile solution is, however, preferred. As set forth above, the reaction solution may contain an electrolyte in a concentration sufficient to allow passage of a direct current potential through the solution in order to maintain optimum catalytic activity by the maintenance of an optimum average surface coverage of ionic copper upon the metallic copper electrode catalyst, or may be in contact with a polyelectrolyte.

The reaction solution may have a pH of about 2.5 to about 12.5. It is preferred, however, that the reaction solution for the process for preparing amides from nitriles by electrochemically maintaining optimum copper catalytic activity can be conducted at a pH of about 5 to about 9. Depending upon the solvent and electrolyte utilized, electrochemical maintenance outside this range could possibly induce the formation of other ionic species which would compete with the hydrolysis process to form unwanted byproducts. The hydrolysis reaction may be run at a temperature of about 20° C. to about 150° C., but is preferably maintained between about 40° C. to about 100° C. and is most preferably run at about 80° C. The reaction may be run at subatmospheric, atmospheric, or superatmospheric pressures.

EXAMPLES 15-22

In Examples 15-22, a Raney copper catalyst was pretreated at potentials ranging from −0.10 to −0.60 volts (versus a silver/silver chloride electrode) as in Examples 9-14 in order to achieve an initial desired surface state prior to the hydrolysis reaction. The pretreatment was conducted in 1.0 molar acetate buffer, of pH 5, in the absence of nitrile. Each pretreated catalyst was then controlled at the pretreatment potential during hydrolysis by the application of potential as required. Surface coverage of ionic copper during the hydrolysis test was calculated from total coulombs consumed in each experiment.

The electrochemical cell/reactor used in the hydrolysis reactions of Examples 15-22 was described in Examples 9-14 above. The D.C. potential of the working electrode catalyst was controlled by a potentiostat.

The working electrode catalyst was 0.5 grams Raney copper, pressed into a pallet and treated as set forth above. The reactant solution was an aqueous solution of 7.2% acrylonitrile by weight of water, containing 0.1 molar sodium acetate electrolyte buffered to pH 5 with acetic acid. The hydrolysis reaction was carried out at 80° C. for about 1 hour. The results of the test runs in Examples 15-22 are reported in Table III, including a listing of the average number of ionic copper monolayers providing partial surface coverage on each catalyst, and the conversion of acrylonitrile to acrylamide for each example. Table III also lists the pretreatment and control potential used for the catalysts. It was determined that the ionic copper compound which provided surface coverage of the metallic copper electrode was cuprous oxide.

The conversion of acrylonitrile to acrylamide reported in Tables I, II and III were plotted against the average number of monolayers of ionic copper exhibited by the catalysts used in Examples 1-22 for the FIGURE. From the FIGURE it can be seen that the catalytic activity of copper catalysts containing metallic copper and having disposed thereon at least a partial coverage of ionic copper increases as the average thickness of the ionic copper film approaches 0.75 monolayer, and that activity is optimized in a range of about 3 to about 5 monolayers of ionic copper. As the average film thickness of ionic copper increases beyond about 5 monolayers, the catalytic activity of the catalyst decreases until at an average thickness of 12.5 monolayers of ionic copper the activity has begun dropping below the level exhibited by a copper catalyst having a partial ionic copper coverage of about 1 monolayer average thickness.

It should be noted that the film thicknesses are an average thickness, and that the surface of the catalyst may contain metallic copper, which may aid in the complexing or coordination of the reactants in the hydrolysis process.

As stated above, the tests outlined in Examples 1-22 were conducted in order to determine small differences in catalytic activity. By the process of the present invention, however, it is possible to obtain very high conversions of nitrile to amide, by using more vigorous reaction conditions, or simply by agitating the reaction mixture or by increasing the ratio of catalyst to reactant present, as would be observed at any point in time in a commercial fixed-bed reactor.

EXAMPLES 23-30

In Examples 23-30 a Raney copper catalyst was prepared and charged to a 10 ml sealed vial containing 7.5 ml of a 6.5% aqueous acrylonitrile solution for one hour at 80° C. The amount of catalyst, average amount of monolayers of ionic copper present, and stirring conditions are listed in Table IV, together with the conversion of acrylonitrile to acrylamide observed. From Table IV, it can be seen that the process of the present invention can be utilized to obtain high conversions of nitrile to amide.

Thus it should be apparent to those skilled in the art that the subject invention accomplishes the objects set forth above. It is to be understood that the subject invention is not to be limited by the examples set forth herein. These have been provided merely to demonstrate operability, and the selection of specific types of copper-containing working electrode catalysts, auxiliary electrodes, reaction solutions, electrolytes, reaction and potential control apparatuses and reaction conditions can be determined from the total specification disclosure provided without departing from the spirit of the invention herein disclosed and described, the scope of the invention including modifications and variations that fall within the scope of the attached claims.

TABLE I

| | Hydrolysis of Acrylonitrile to Acrylamide Optimization of Catalytic Activity | | | |
|---|---|---|---|---|
| Example | Average No. Monolayers Ionic Cu on Cu* | Molar % Conversion to Acrylamide | Catalyst Reduction Temp. (°C.) | H$_2$ Flow Rate (cc/Min) |
| 1 | 1.44 | 11.5 | 287 | 136 |
| 2 | 1.47 | 11.8 | 321 | 120 |
| 3 | 2.00 | 12.7 | 364 | 136 |
| 4 | 3.07 | 17.5 | 204 | 53 |
| 5 | 3.28 | 16.5 | 250 | 53 |
| 6* | 3.98 | 17.3 | — | — |
| 7* | 8.65 | 12.5 | — | — |
| 8* | 12.19 | 9.4 | — | — |

*Not reduced

TABLE II

| | Hydrolysis of Acrylonitrile to Acrylamide Electrochemical Optimization of Catalytic Activity | | | |
|---|---|---|---|---|
| Example | Average No. Monolayers Ionic Cu on Cu* | Molar % Conversion to Acrylamide | Catalyst Pretreatment D.C. Potential (V)** | Catalyst Rest Potential (V)** |
| 9 | 0.12 | 1.3 | −.600 | −.559 |
| 10 | 0.81 | 5.0 | −.600 | −.533 |
| 11 | 0.84 | 5.4 | −.500 | −.455 |
| 12 | 1.02 | 7.0 | −.400 | −.354 |
| 13 | 4.23 | 18.0 | — | −.144 |
| 14 | 4.53 | 16.7 | −.116 | −.164 |

**Versus Ag/AgCl electrode

TABLE III

Hydrolysis of Acrylonitrile to Acrylamide
Electrochemical Maintenance of Catalytic Activity

| Example | Average No. Monolayers Ionic Cu on Cu* | Molar % Conversion to Acrylamide | Catalyst Pretreatment D.C. Potential (V)** | Catalyst Control Potential During Hydrolysis (V)** |
|---|---|---|---|---|
| 15 | 12.21 | 7.2 | −.100 | −.100 |
| 16 | 6.77 | 10.9 | −.119 | −.119 |
| 17 | 2.02 | 12.4 | −.150 | −.150 |
| 18 | 1.47 | 11.5 | −.200 | −.200 |
| 19 | 1.23 | 9.9 | −.300 | −.300 |
| 20 | 0.84 | 5.9 | −.400 | −.400 |
| 21 | 0.58 | 2.0 | −.500 | −.500 |
| 22 | 0.16 | 1.3 | −.600 | −.600 |

**Versus Ag/AgCl electrode

TABLE IV

Hydrolysis of Acrylonitrile to Acrylamide

| Example | Grams Catalyst | Average No. Monolayers Ionic Cu on Cu* | Molar % Conversion to Acrylamide | Agitation |
|---|---|---|---|---|
| 23 | 0.5 | 2-3 | 37 | None |
| 24 | 0.5 | 2-3 | 79 | Stirring |
| 25 | 0.5 | 5-6 | 33 | None |
| 26 | 0.5 | 5-6 | 79 | Stirring |
| 27 | 5.0 | 2-3 | 56 | None |
| 28 | 5.0 | 2-3 | 73 | Stirring |
| 29 | 5.0 | 5-6 | 71 | None |
| 30 | 5.0 | 5-6 | 81 | Stirring |

We claim:

1. A process for the production of amides from nitriles in water comprising:
   contacting an electrolytic solution of nitrile in water in an electrochemical reactor having at least one copper-containing electrode wherein said copper-containing electrode has at least a partial surface coverage of at least an average thickness of 0.75 monolayers of ionic copper, maintaining the pH of said electrolytic solution below 7, and
   applying a direct current to the electrochemical reactor.

2. A process as in claim 1 wherein said electrolytic solution contains an electrolytically conductive salt.

3. A process as in claim 1 wherein said electrolytic solution comprises a reaction solution containing nitrile and water in contact with a polyelectrolyte.

4. A process as in claim 1, wherein said nitrile is acrylonitrile and the amide produced is acrylamide.

5. A process as in claim 1, wherein the pH of said electrolytic solution is about 5 to about 7.